Nov. 22, 1966 T. A. ROSE 3,287,661

MICROWAVE OSCILLATOR

Filed Aug. 28, 1964 2 Sheets-Sheet 1

INVENTOR.
Thomas A. Rose
BY
Blair & Buckles
ATTORNEYS

INVENTOR.
*Thomas A. Rose*
BY

*Blair & Buckles*
ATTORNEYS.

United States Patent Office
3,287,661
Patented Nov. 22, 1966

3,287,661
MICROWAVE OSCILLATOR

Thomas A. Rose, Tampa, Fla., assignor to Trak Microwave Corporation, Tampa, Fla.

Filed Aug. 28, 1964, Ser. No. 392,770
5 Claims. (Cl. 331—98)

This invention relates to the art of microwave oscillators, and more particularly, to an improved microwave oscillator of the re-entrant type capable of operating at ultrahigh frequencies with greatly improved efficiency of operation. The invention has particular but not limited applications to ultrahigh frequency triode oscillators of extremely small physical size capable of supplying greatly increased usable power output.

Microwave oscillators of the re-entrant type employ a co-axial transmission line having a vacuum tube positioned within the line at one end thereof. The plate and the cathode of the tube are electrically connected to the inner and outer conductors of the co-axial line to energize the tube. The grid is contacted by a conducting sleeve extending co-axially between the inner and outer conductors to define a grid-plate cavity and a grid-cathode cavity. This grid sleeve functions to couple electrical energy from the grid-plate cavity back to the grid-cathode cavity in proper phase and amplitude for oscillatory signal regeneration.

In pushing re-entrant type oscillators to higher operating frequencies, substantial redesigning of the physical dimensions of the co-axial lines is required. These physical dimensions must be reduced in order to achieve resonance at these higher frequencies. Since it is virtually impossible to predict with any degree of accuracy the total qualitative effect of such design changes, it is typically more practical to experiment with various combinations of physical sizes for the various parts of the oscillator in order to achieve satisfactory oscillatory operation of the tube in a desired frequency range. In other words, oscillator design for a particular operating frequency is largely an empirical proposition.

At frequencies in excess of 4000 megacycles, the problems encountered in triode oscillator design become particularly acute. The wavelength of the electrical energy at this frequency is less than three inches in length. Thus the physical dimensions of the various parts of the oscillator become extremely critical since even a small change in a physical dimension is a significant fraction of a wavelength.

It is appreciated by those skilled in the art that, in order to achieve efficient oscillatory operation, the phase and the amplitude of the electrical energy fed back to the grid of the tube must be in proper relation to the phase and amplitude of the energy developed at the plate. It has been discovered that, in high frequency designs, optimum phase relationship and optimum amplitude relationship of the feedback signal are not readily achieved by a single physical design. In other words, the co-axial lines of a re-entrant oscillator may be designed to achieve an optimum feedback amplitude relationship, but the feedback phase relationship is then substantially less than optimum. The converse situation also obtains.

At frequencies below 4000 megacycles, this incongruity of feedback amplitude and phase relationship may be satisfactorily resolved by resorting to a compromise design. The feedback signal amplitude and phase relationships, by appropriate oscillator design, are each established at somewhat less than optimum values to achieve tolerable oscillatory operation. The resulting reduction in efficiency and output power are necessary sacrifices.

However, at frequencies in excess of 4000 megacycles, no tolerable design compromise has been found to exist for extremely small oscillators (less than one inch in diameter) consistent with acceptable operating efficiency and output power. Since the wavelength of the electrical energy at these elevated frequencies is small, small changes in physical dimensions result in signficant changes in the characteristics of the feedback signals. Accordingly, slight departures from the physical design for optimum feedback amplitude relationship, for example, do not produce sufficient improvement in the feedback phase relationship to obtain proper oscillatory operation. A sufficient departure from this optimum design to produce a satisfactory phase relationship results in a wholly unsatisfactory feedback amplitude relationship.

It is therefore an object of the present invention to provide a re-entrant type triode oscillator capable of operating at frequencies in excess of 4000 megacycles.

A further object is to provide a re-entrant type oscillator of the above character capable of high frequency operation with improved efficiency and output power.

An additional object is to provide a high frequency, re-entrant type oscillator of the above character which is optimumly matched in that the relationship of the characteristics of the feedback signal to the signal characteristics at the plate of the oscillator tube is optimized.

A still further object is to provide a re-entrant type triode oscillator of the above character wherein the relationship of feedback amplitude and phase necessary to achieve optimum efficiency of operation and output power is substantially achieved.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

In the copending application of Benjamin F. Gregory for "Dielectric Loaded Cavity Oscillator," Serial No. 318,731 filed October 24, 1963, and assigned to the same assignee as the present invention, there is disclosed and claimed a microwave re-entrant oscillator which includes a dielectric load positioned in the grid-plate cavity for the purpose of varying the electrical length of the grid-plate cavity without necessarily varying its physical length. This dielectric load consists of a slug of dielectric material having properly selected dielectric characteristics and physical dimensions to compensate for the shortcomings in the physical design of a re-entrant oscillator and thus provide substantially improved feedback signal characteristics for increased operating efficiency and output power. Unfortunately, this dielectric load attenuates the electromagnetic energy in the grid-plate cavity thus reducing output power.

According to the present invention, the electrical parameters of the grid-cathode cavity are selectively altered in a novel manner so as to alter the electrical length of the grid-cathode cavity without necessarily varying its physical length. In so doing, the grid-cathode cavity is substantially optimumly matched, physically and electrically, to the grid-plate cavity thereby greatly improving the feedback signal characteristics. I have found that the operating efficiency and output power is increased from five to ten times that of conventionally designed reentrant oscillators. Moreover, since the present invention does not require the introduction of lossy materials into the cavities of the oscillator, the operating performance is improved over that of dielectrically loaded oscillators.

Figure 1:
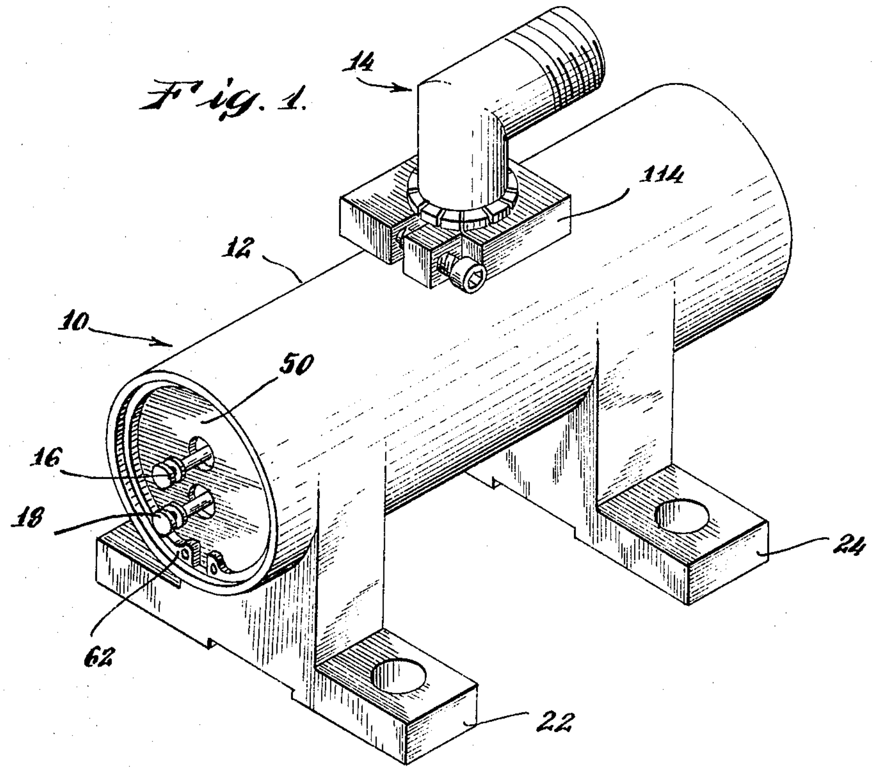
FIGURE 1 is a perspective external view of a microwave source embodying my invention.
Figure 2:
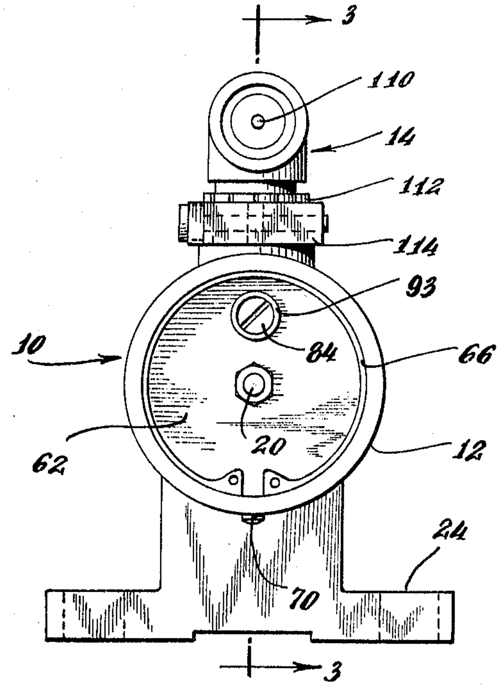
FIGURE 2 is an end elevation view of the microwave source of FIGURE 1.

Referring to FIGURE 1, a microwave source 10 includes a cylindrical outer shell or housing 12 formed from electrically conductive material, preferably brass. A coaxial output connector, indicated generally at 14, communicates with the interior of the housing 12 to provide means for coupling electromagnetic energy developed by the source 10 to an output load, not shown. A pair of filament terminal posts 16 and 18 extending from one end of the housing 12 facilitates external circuit connection to a filament supply source, not shown, while a plate terminal post 20 extending from the other end of the housing 12, seen in FIGURE 2, provides for external circuit connection to a suitable B+ voltage source, not shown. A pair of mounting feet 22 and 24 affixed to the housing 12 facilitate mounting of the source 10 to a chassis, not shown.

Figure 3:
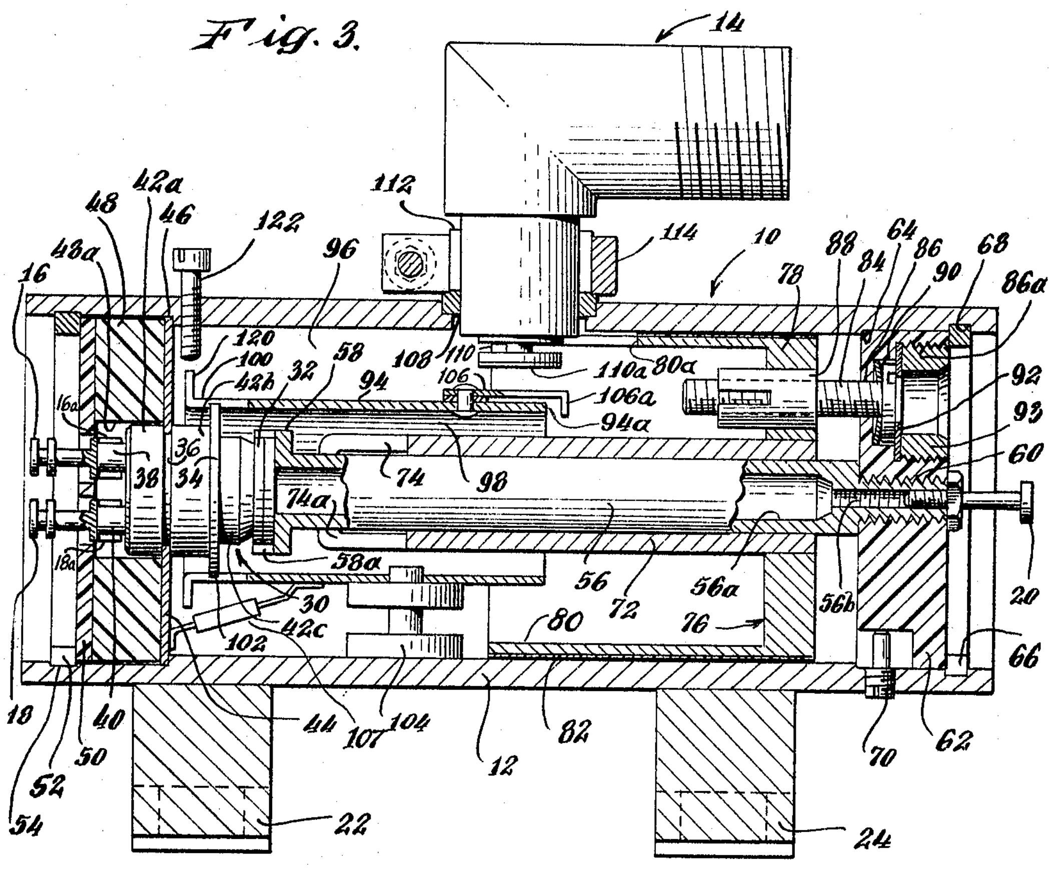
FIGURE 3 is an enlarged cross-sectional side elevational view taken along line 3—3 of FIGURE 2.

Turning to FIGURE 3, a microwave triode 30, which may be a General Electric 7486 or its equivalent, is rigidly mounted concentrically within the left-hand end of the housing 12. The triode 30 includes a plate pin 32, a grid ring 34, a cathode ring 36, and a pair of filament pins 38 and 40. These elements of the triode 30 are separated by ceramic sections **42*a*, 42*b* and 42*c***.

The triode 30 is fitted with an annular cathode clamp 44 which makes electrical contact with the cathode ring 36. In practice, the electrically conducting cathode clamp 44 is formed of two semi-circular sections which are fitted in the annular groove between the ceramic sections **42*a* and 42*b* where the cathode ring 36 is located. The outer peripheral portion of the cathode clamp 44 is seated against an annular shoulder 46 formed in the interior surface of the housing 12. An insulating annular spacer 48, having an inner bore 48*a* to clear the ceramic section 42*a* of the triode 30, is placed against the cathode clamp 44. An annular filament block 50 of insulating material is provided with a pair of holes serving to mount the filament terminal posts 16 and 18 which project therethrough. The inner end portions of the filament terminal posts 16 and 18 are formed with cup-shaped contactors 16*a* and 18*a* respectively, for making electrical contact with the heater pins 38 and 40. A snap ring 52 is positioned in an annular groove 54 in the inner surface of the housing 12 to hold the filament block 50 and the spacer 48 in place with the cathode clamp 44 pressed against the annular shoulder 46 so as to make good electrical contact with the housing 12**.

Still referring to FIGURE 3, an electrically conducting plate line member 56 is disposed coaxially within the housing 12. The inner end of the plate line member 56 is fitted with a contact cup 58 for making electrical contact with the plate pin 32 of the triode 30. The lip of the contact cup 58 is slotted to form a plurality of resilient fingers **58*a* which serve to grip the plate pin 32 and insure good electrical contact therewith. The outer end portion of the plate line member 56 is formed with external threads 60 for engagement with a threaded central bore in an insulating end plug 62. The end plug 62 is disposed within the housing 12 adjacent the righthand end, as seen in FIGURE 3, and retained against an annular shoulder 64 formed in the interior surface of the housing 12 by snap ring 66 positioned in an annular groove 68. The end plug 62 is effectively locked in position by a set screw 70 threaded through the housing 12 and into engagement with the end plug 62**.

The plate line member 56 is provided with an axial bore **56*a* extending the entire length thereof. This axial bore is threaded at 56*b* to receive the plate terminal post 20. Thus the D.C. B+ voltage applied to the plate terminal post 20 is conducted to the plate pin 32 of the triode 30 by the electrically conductive plate line member 56**.

The axial bore **56*a* in the plate line member 56 is provided to facilitate disassembly of the source 10. Heretofore, the snap ring 66 and the set screw 70 were removed and the plate line member 56 was merely withdrawn to the right as seen in FIGURE 3 to disengage the contact cup 58 from the plate pin 32. Since the triode 30 is also mounted in place by the cathode clamp 44, likely as not, the triode was damaged. With the provision of the axial bore 56*a*, a ram rod, not shown, can be inserted therethrough to push against the plate pin 32 during disassembly. Ideally the ram rod is provided with a threaded portion to engage the threaded portion 56*b* of the axial bore 56*a* so that the disengagement of the contact cup 58 from the plate pin 32 is effected gradually and without exerting tensile forces on the body of the triode 30. Disassembly can thus be effected without damaging the triode 30**.

A sliding line member 72, having a tubular cross-section, is disposed coaxially about the plate line member 56. One end of the sliding line member 72 is slotted to provide a plurality of resilient fingers 74 having inwardly turned end portions **74*a* riding on the surface of the plate line member 56 and making good electrical contact therewith. The other end of the sliding line member 72 carries a tuning plunger assembly 76 having an end wall 78 and a cylindrical member 80 mounted coaxially with the housing 12. The tuning plunger assembly 76 is the non-contacting type and is appropriately dimensioned so as to function as a radio frequency choke. The outer surface of the cylindrical portion 80 is covered with a layer 82 of insulation, such as Mylar, to insure D.C. isolation between tuning choke assembly 76 and the housing 12**.

In order to adjust the axial position of the tuning choke assembly 76, as well as the sliding line member 72, a tuning screw 84 projects through a bore 86 in the end plug 62 and into threaded engagement with a tuning lock nut 88 mounted in the end wall 78 of the tuning plunger assembly. The end plug 62 is counterbored at **86*a* to accommodate the head of the tuning screw 84. A bowed spring washer 90 is positioned under the head of the tuning screw 84 so as to urge the tuning screw to the right, as seen in FIGURE 3, and against a thrust washer 92 held in place by a captive nut 93 threaded into the counterbore 86*a*. It will thus be seen that as the tuning screw 84 is rotated, the tuning lock nut 88 advances on the threaded shank of the tuning screw carrying with it the tuning plunger assembly 76 and the sliding line member 72 so as to tune the source 10** to the desired frequency.

Figure 4:
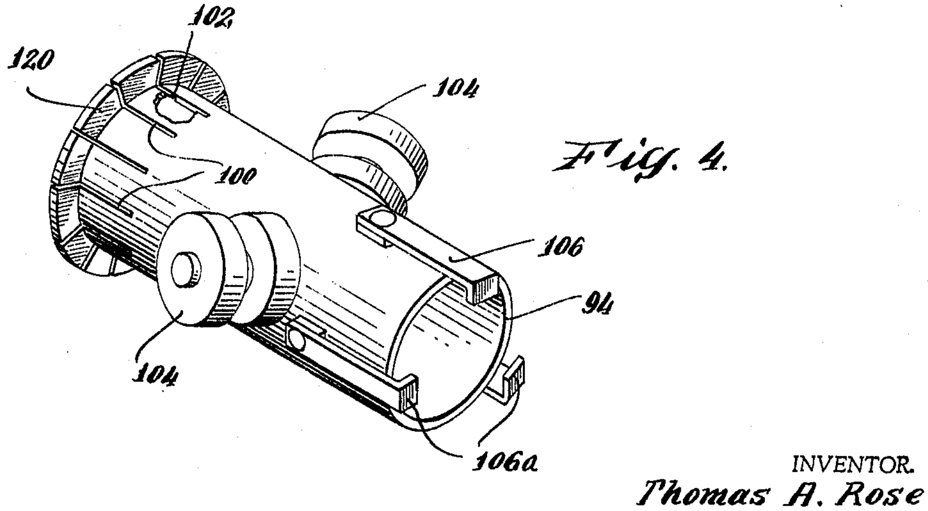
FIGURE 4 is an enlarged perspective view of the novel grid sleeve construction employed in my invention.

An electrically conducting grid sleeve 94, seen in both FIGURES 3 and 4, is disposed coaxially between the housing 12 and the plate line member 56 so as to define a grid-cathode cavity, indicated at 96, and a grid-plate cavity, indicated at 98. One end of the grid sleeve 94 is slotted to form a plurality of resilient fingers 100 which ride over the protruding grid ring 34 of the triode 30. The grid ring 34 is lodged in an internal groove 102 formed in each of the resilient fingers 100 so as to insure good electrical contact with the grid sleeve 94. The mechanical and electrical contact between the grid sleeve 94 and the grid ring 34 may be enhanced with solder. A plurality of grid buttons, one being shown at 104 in FIGURE 3, serve to mount the grid sleeve coaxially within the housing 12 and provide with the cathode clamp 44 and plate line member 56 mounting support for triode 30.

A plurality of bimetallic, temperature compensating widgets 106 are mounted on the grid sleeve 94. These widgets have inwardly turned end portions **106*a* which function to tune against the sliding line member 72. These widgets 106 deflect with variations in temperature to vary the positions of their inwardly turned end portions 106*a*** relative to the sliding line member 72, thereby automatically compensating for the effects of temperature variations on the operating frequency of the source 10. A grid leak resistor 107 is connected between the grid sleeve 94 and the cathode clamp 44.

The output connector 14 projects through an aperture 108 in the housing 12 and has an inner conductor 110 carrying a disc-shaped coupling member 110*a* which is disposed in the grid-cathode cavity 96 for effectively capacitively coupling electromagnetic energy from the grid-cathode cavity to a load (not shown). The output connector 14 is inserted in a mounting sleeve 112 received in aperture 108 and affixed to the housing 12 by any suitable means such as dip brazing. As best seen in FIGURE 2, the upper end of this mounting sleeve 112 is slotted in order that the output connector 14 may be clamped in place by means of a clamp 114. The cylindrical member 80 of the tuning plunger assembly 76 is cut out at 80*a* in order to clear the output connector 14 when tuning the source 10.

I have discovered that by providing the grid sleeve 94, seen in FIGURES 3 and 4, with an outwardly extending radial flange 120, the operating efficiency of the source 10 is increased substantially over similarly constructed microwave sources, without this flanged grid sleeve construction. The flange 120, axially located in close proximity to the cathode clamp 44, is preferably formed integrally with the grid sleeve 94 by an outward turning of the grid ring contacting fingers 100.

I have also discovered that the operating efficiency of the source 10 may be enhanced by providing one or more screws 122 (FIGURE 3) which are threaded through the housing 12 and into the grid-cathode cavity 96 adjacent the cathode clamp 44. When using the screws 122, the grid sleeve 94 may be of conventional construction or provided with the flange 120, as desired. The effect of the screws 122 on the operating efficiency may be readily varied merely by varying the extent to which the ends of the screws project into the grid-cathode cavity 96, thereby providing adjustment when the source 10 is tuned to different operating frequencies.

The reasons why the flange 120 and the screws 122 should produce such a startling improvement in the operating efficiency of the source 10 are not entirely understood since very little is known about the behavior of standing waves at this end of the grid-cathode cavity 96. Quite apparently, the phase relationship between the electromagnetic energy at the plate 32 of triode 30 and the energy fed back to the grid 34 has been optimized so as to achieve substantially optimum signal regeneration. As was demonstrated in the above-noted copending application, Serial No. 318,731, the grid-plate cavity had to be physically longer than the grid-cathode cavity in order to achieve an optimum feedback phase relationship. Since the grid sleeve determined the physical length of both these cavities, it became impossible to physically accommodate the required lengths of the grid-plate and grid-cathode cavities in a single design. To overcome this situation, a dielectric load was formerly inserted in the grid-plate cavity so as to enable the grid-plate cavity to be shortened physically while, at the same time, lengthened electrically. As a result, the voltage maximums of the energy in both the grid-plate and grid-cathode cavities could occur at the free end of the grid sleeve as required for maximum coupling of properly phased energy from the grid-plate cavity to the grid-cathode cavity. In addition to the dielectric material being lossy, the dielectric constant will vary with temperature thus rendering the source quite temperature sensitive.

According to the present invention, the presence of the flange 120 or the presence of the screws 122 along or in combination with the flange introduce discontinuities at the input to the grid-cathode cavity 96 which increase the input capacitive reactance of this cavity. This is believed to have the effect of electrically shortening the grid-cathode cavity 96. Considering the equation $$X_c = Z_{gk} \tan Bl$$

where $X_c$ equals the effective input capacitive reactance to the grid-cathode cavity 96, $Z_{gk}$ equals the characteristic impedance of the grid-cathode cavity, B equals the phase constant for the energy in the grid-cathode cavity, and $l$ equals the length of the grid-cathode cavity which is terminated in a short-circuit, i.e., length to the first voltage minimum, it will thus be seen that, with $Z_{gk}$ and B constant, an increase in $X_c$ produces an increase in the length $l$ of the grid-cathode cavity to the first voltage minimum. The distance to this voltage minimum plus the distance from this voltage minimum to the next voltage maximum corresponds to the ideal length of the grid-cathode cavity 96 and thus the ideal length of the grid sleeve 94.

Consequently, the grid-cathode cavity 96 may be physically lengthened by extending the free end 94*a* of the grid sleeve 94 to the point where the voltage maximum of the energy in the grid-plate cavity 98 normally occurs without the inclusion of a dielectric load. Since the electrical length of the grid-cathode cavity 96 is appropriately shortened to the extent that it is physically lengthened by extension of the grid sleeve 94, the voltage maximum of the energy in this cavity will thus also occur at the free end 94*a* of the grid sleeve 94. The conditions for the optimum coupling of energy around the free end 94*a* of the grid sleeve 94 as well as for the optimum phase relationship of feedback energy are substantially satisfied. Since the inclusion of the grid sleeve flange 120 or the screws 122 do not materially effect the characteristic impedance of the grid-cathode 96, the grid-plate cavity 98 and the grid-cathode cavity may be readily designed for optimum feedback amplitude relationship.

In a working embodiment of the present invention, the grid sleeve 94 was formed of brass having a .460 inch inner diameter, a .500 inch outer diameter and a length of .990 inch. The outer diameter of the flange 120 was .625 inch and its thickness was .025 inch. Using a type 7486 GE triode 30 with 170 volts applied to the plate 32 and a filament voltage of 6.3 volts, the power averaged out to 45 milliwatts for an operating frequency ranging from 4200 to 4600 megacycles. Without the flanged grid sleeve construction, the usable power out was only from 10 to 15 milliwatts. Peak power outputs have been measured up to as high as 100 milliwatts.

Although the above results were obtained with a re-entrant oscillator of small physical size (housing 12 having an inner diameter less than one inch), it is contemplated that, by the present invention, the improvements in operating efficiency can be achieved with physically larger re-entrant type microwave oscillators using the flanged grid sleeve construction or the screws 122 alone or in combination with the flange 120.

In addition, it is contemplated that the flange 120 need not be of the precise configuration shown in the drawings. Any discontinuity introduced into the grid-cathode cavity 96 to give the desired result of shortening its electrical length is considered with the purview of the invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. An ultra-high frequency oscillator comprising, in combination (A) an outer conductor, (B) a coaxial inner conductor, (C) a triode mounted within said outer conductor, said triode having (1) a cathode terminal electrically connected to said outer conductor and (2) a plate terminal electrically connected to said coaxial inner conductor, (D) an elongated tubular grid sleeve member, said member being (1) electrically connected to a grid terminal of said triode and (2) coaxially disposed between said outer conductor and said coaxial inner conductor to define (a) a grid-plate cavity and (b) a grid-cathode cavity, (c) said grid sleeve member serving to locate the physical terminations of said grid-cathode and grid-plate cavities, and (E) a flange affixed to said grid-sleeve member (1) said flange extending into said grid-cathode cavity at a point axially remote from the termination of said grid-cathode cavity, (2) so as to conform the electrical and physical lengths of said grid-cathode and grid-plate cavities.

2. The device claimed in claim 1 being tuned to operate at a frequency in excess of 4000 megacycles per second.

3. An ultra-high frequency oscillator comprising, in combination (A) a coaxial outer conductor (B) a coaxial inner conductor having an axial bore (C) a tube mounted within one end of said coaxial outer conductor (1) a cathode terminal of said tube electrically connected to said coaxial outer conductor and (2) a plate terminal of said tube electrically connected to said coaxial inner conductor (D) an elongated tubular sleeve member (1) coaxially aligned between said coaxial outer conductor and said coaxial inner conductor and, in combination therewith, defines (a) a grid-plate cavity and (b) a grid-cathode cavity, (2) electrically connected at one end to a grid terminal of said tube, (3) the other end of said sleeve member serving to define the terminations of said grid-plate cavity and said grid-cathode cavity and (E) an electrically conductive annular flange integrally formed with said sleeve member, (1) said flange extending into said grid-cathode cavity at a point remote from the termination thereof and (2) serving to alter the electrical length of said grid-cathode cavity such that substantially maximum coupling of properly phased energy from the grid-plate cavity to the grid-cathode cavity at said other end of said grid sleeve is achieved.

4. The device defined in claim 3 wherein (A)(1) said outer conductor has an inner diameter of less than one inch.

5. The device defined in claim 3 which further includes (F) at least one screw adjustably threaded through said outer conductor and extending radially inward to a point adjacent the end of said flange.

References Cited by the Examiner

UNITED STATES PATENTS

| | | | |
|---|---|---|---|
| 2,421,591 | 6/1947 | Bailey | 330—56 |
| 2,617,038 | 11/1952 | Russell | 331—98 |
| 2,619,597 | 11/1952 | Mylnczak | 331—98 |
| 3,173,104 | 3/1965 | Beaty | 331—98 |

ROY LAKE, *Primary Examiner.*

J. KOMINSKI, *Assistant Examiner.*